(12) United States Patent
Koehler et al.

(10) Patent No.: US 6,500,473 B1
(45) Date of Patent: Dec. 31, 2002

(54) COLORING SUBSTANCE COMPOSITION AND A METHOD OF MANUFACTURING SAME

(75) Inventors: Klaus Koehler, Frederiksberg (DK); Soeren Jan Jacobsen, Copenhagen (DK); Claus Soendergaard, Roskilde (DK); Martin Kensoe, Hvidovre (DK)

(73) Assignee: Chr. Hansen A/S, Hoersholm (DK)

( * ) Notice: Subject to any disclaimer, the term of this patent is extended or adjusted under 35 U.S.C. 154(b) by 0 days.

(21) Appl. No.: 09/555,738
(22) PCT Filed: May 18, 2000
(86) PCT No.: PCT/DK00/00270
  § 371 (c)(1),
  (2), (4) Date: Jul. 20, 2000
(87) PCT Pub. No.: WO00/70967
  PCT Pub. Date: Nov. 30, 2000
(51) Int. Cl.$^7$ .................................................. A23L 1/275
(52) U.S. Cl. .......................... 426/89; 426/540; 426/577; 536/2; 514/54; 514/57; 514/777
(58) Field of Search ................................ 426/577, 540, 426/103, 89; 536/2; 514/57, 54, 777

(56) References Cited

U.S. PATENT DOCUMENTS

| | | | | |
|---|---|---|---|---|
| 4,448,794 A | * | 5/1984 | Wissgott et al. | ............. 426/267 |
| 5,008,254 A | * | 4/1991 | Weibel | ......................... 514/57 |

FOREIGN PATENT DOCUMENTS

| | | |
|---|---|---|
| EP | 0 426 434 A1 | 5/1991 |
| WO | 91/06292 | 5/1991 |
| WO | 94/19411 | 9/1994 |
| WO | 97/26802 | 7/1997 |
| WO | 97/26803 | 7/1997 |

* cited by examiner

*Primary Examiner*—Nina Bhat
(74) *Attorney, Agent, or Firm*—Foley & Lardner

(57) ABSTRACT

A composition comprising coloring substance bodies that are at least partially coated with beet pectin, chicory pectin and/or Jerusalem artichoke pectin or other pectin types having a high degree of acetylation. The composition which may be water dispersible is useful for preparation of health improving products and/or coloring products for use in the coloring of edible products including food products and nutraceuticals, and for coloring of pharmaceutical products.

37 Claims, No Drawings

COLORING SUBSTANCE COMPOSITION AND A METHOD OF MANUFACTURING SAME

This application claims benefit under 35 U.S.C. 371 of PCT/DK00/00270 file May 18, 2000.

FIELD OF INVENTION

The present invention relates in its broadest aspect to the field of manufacturing food products and pharmaceutical products and specifically there is provided a novel colouring substance composition, which is useful for colouring such products.

TECHNICAL BACKGROUND AND PRIOR ART

Colouring agents containing natural or synthetic colouring substances are commonly used as additives in the manufacturing of food products and pharmaceutical products. A wide range of such colouring agents are commercially available making it possible for the manufacturer, where a particular colour tone is desired, to select a single colouring agent having the desired colour or a mixture of colouring agents, which in an appropriate combination impart the desired colour to the product. Or alternatively, the manufacturer may with to use an agent which, in addition to its colouring effect, has a health improving effect and hence select such a single health improving agent or a mixture of such agents.

The commercially available colouring agents can contain synthetic substances including substances that are also normally referred to as dyes or azodyes, or such agents can contain pigments or other colouring substances of natural origin, e.g. in the form of plant material containing a colouring substance, or as more or less purified colouring substances separated from plant, animal or microbial materials naturally containing such substances.

Occasionally, food grade or pharmaceutically acceptable colouring agents are provided that contain colouring substances in the form of synthetic or artificial compounds having substantially the same chemical composition as natural occurring colouring substances. This type of colouring agents are also referred to in the art as "natural identical" colours. However, in the present context, the expression "naturally occurring colouring agents" is used to designate pigments or other colouring substances which are derived from a natural source.

Any of the above types of available colouring agents including agents comprising food grade or pharmaceutically acceptable natural colouring substances can be hydrophilic or hydrophobic and thus, water soluble, sparingly soluble in water and aqueous media or essentially water-insoluble. A hydrophilic, water soluble colouring material as such can therefore only be used for colouring a product having an aqueous phase during and/or after manufacturing. Similarly, the use of a hydrophobic and/or water insoluble colouring material or substance as such requires that the product to be coloured has a hydrophobic or lipid phase in which the colouring substance is soluble. Certain colouring substances such as curcumin are substantially insoluble in water at neutral pH or below, but are soluble in alkaline aqueous media.

However, it may be desirable to obtain the colour tone of a particular colouring substance that is insoluble or sparingly soluble in an aqueous phase or a mixture of such substances in a food product or a pharmaceutical product that does not comprise a phase in which the colouring substance is sufficiently soluble to provide the desired colouring. There is therefore a continuous industrial need for colouring agents containing colouring substances that are water insoluble or sparingly insoluble in water, which are in the form of water-miscible or water dispersible compositions having a high colouring efficiency.

WO 91/06292 discloses a process of preparing a water dispersible composition comprising a hydrophobic/aerophilic solid pigment that is prepared by milling the pigment in an aqueous medium in the presence of a hydrocolloid, in particular gelatine, gum arabic, soybean protein and/or modified starch. Similar methods are disclosed in WO 97/26802 and WO 97/26803 where gelatine is used as the hydrocolloid. However, none of these disclosures refer to the use of beet pectin or other pectins of a similar type such as chicory pectin or Jerusalem artichoke pectin as a wetting agent and/or suspending agent in the manufacturing of compositions of water-insoluble or sparingly soluble colouring substances, including such compositions that are water dispersible.

It has now been found that compositions of colouring substances that are hydrophobic, water-insoluble and/or sparingly insoluble in water and which have a high colouring efficiency or other desired properties in food products and pharmaceutical products can be provided by using beet pectin, chicory pectin and/or Jerusalem artichoke pectin as a wetting and/or dispersing agent. It was surprisingly found that compositions comprising such pectins have a significantly superior colouring effect when comparing with other hydrocolloids or other pectin types such as the commonly used citrus pectin types.

A conventionally preferred hydrocolloid in the manufacturing of water dispersible compositions of hydrophobic solids is gelatine. However, being of animal origin with the associated risk that it may carry pathogenic or toxic substances and the fact that most gelatine types are not "kosher" grade implies that the incorporation of gelatine into food products, at least for some consumers, may be objectionable. It is therefore one significant objective of the present invention to provide the means for manufacturing coloured or pigmented food products and pharmaceutical products that do not imply that any such objections can be raised and at the same time provide water-dispersible colouring substance compositions having a high colouring efficiency.

SUMMARY OF THE INVENTION

Accordingly, the present invention provides in a first aspect a composition comprising bodies of a colouring substance that are at least partially coated with a pectin selected from beet pectin, chicory pectin and Jerusalem artichoke pectin. In useful embodiments, the colouring substance is a solid pigment that, at least under certain conditions, is insoluble or sparingly soluble in water.

In a further aspect the invention pertains to a method of producing a colouring substance composition as defined above, said method comprising preparing a dispersion of the colouring substance by comminuting said pigment in an aqueous phase comprising beet pectin, chicory pectin and/or Jerusalem artichoke pectin in an amount of at least 1% of the colouring substance to obtain a dispersion containing the colouring substance in the form of bodies of the colouring substance that are at least partially coated with the pectins. In accordance with the invention it may be preferred that the colouring substance bodies obtained have an average largest dimension of at the most 10 μm such as the most 5 μm including an average largest dimension of at the most 1 μm.

In still further aspects, the invention relates to the use of the composition of the invention in the manufacturing of an edible product, the use of the composition in the manufacturing of a pharmaceutical or nutriceutical product, a pharmaceutical or nutraceutical product comprising the composition according to the invention and edible products comprising such composition.

In yet other aspects of the present invention colouring compositions are provided which comprise chlorophylin (30 ppm), turmeric (30 ppm) or bixin (20 ppm) which compositions, when tested in a soft drink system containing sucrose, 430.0 g; Na-benzoate, 0.7 g; K-sorbate, 0.9 g; Ascorbic acid, 0.1 g; Citric acid mono-hydrate, 8.6 g and demineralised water to 5 liter, results in a chroma value of at least 33, 30 and 25, respectively when measured with a Minolta Tristimulus CT 310 apparatus.

DETAILED DISCLOSURE OF THE INVENTION

The colouring substance composition according to the invention comprises colouring substance bodies that are at least partially coated or encapsulated with beet pectin, chicory pectin and/or Jerusalem artichoke pectin. In preferred embodiments the colouring substance is water-insoluble or sparingly insoluble in water and aqueous media. Several of such substances are hydrophobic and/or aerophilic, implying that they are not readily wetted when contacted with an aqueous medium that does not contain a suitable wetting agent. As used herein, the expressions "sparingly soluble in water", "water-insoluble" or "hydrophobic" are used to indicate that the colouring substance will occur as a separate phase in aqueous media and/or has such a high degree of hydrophobicity that it cannot be dispersed or suspended in water without the application of high shear stress and/or the addition of surface active substances such as emulsifying agents or tensides.

Certain colouring substances that are water-insoluble or sparingly soluble in water may have a low degree of hydrophobicity or even be hydrophilic. Such substances are also encompassed by the invention. In the present context, the expression "water-insoluble (or sparingly soluble in water) and hydrophilic" indicates that the colouring substance in the amounts used herein is water-insoluble or sparingly soluble in aqueous media at described above. Accordingly, colouring substances of a group, which is generally referred to as hydrophilic, are actually insoluble or sparingly soluble in aqueous media at about neutral pH or below, or at pH values up till about 9. Several food products have an aqueous phase with a pH below 7 and this acidic environment will in many cases render a colouring substance as such unstable and the substance will tend to precipitate resulting in a change of the colour hue. This is e.g. observed in products such as acidified milk products. The compositions of the present invention where the colouring substances are covered by pectin are thus useful for such acidic food products.

The present invention is based on the finding that certain pectin substances including pectin derived from sugar beet, Beta vulgaris, chicory pectin and Jerusalem artichoke pectin are highly effective as wetting and/or dispersing agents in the preparation of a composition of the invention. Pectin is a naturally occurring polysaccharide, essentially made up of regions containing polygalacturonic acid chains and regions containing chains which consist alternately of rhamnose units and galacturonic acid units with side chains mainly containing arabinose and galactose units. The acid groups of the galacturonic acid units are partially esterified with methanol and some of the hydroxyl groups thereof may be acetylated. In contrast to e.g. citrus pectin and apple pectin, beet pectin, chicory pectin and Jerusalem artichoke pectin have a relatively high degree of acetylation. It is hypothesised that at least one factor determining the high wetting and/or dispersing efficiency of these pectins is their relatively high content of acetyl groups. The presence of hydrophobic groups is known to give the molecule a surface-active character which will enhance the emulsifying properties of a compound. Acetyl groups may enhance the hydrophobic nature of the pectin, thereby decreasing surface tension and increasing dispersability. It is therefore assumed that other pectin species having a high degree of acetylation such as pectin derived from chicory or Jerusalem artichoke will have similar useful effects e.g. in the manufacturing of a composition according to the invention. The use of pectins having a relatively high degree of acetylation (DA), such as a DA in the range of at least 10–60%, including a DA in the range of 20–50% e.g. a DA in the range of 30–40%, is also encompassed by the invention. It is further contemplated that pectins having a DA of at least 10%, 20%, 30%, 40%, 50% or 60%, is useful in order to obtain compositions having the characteristics of the present invention.

Acetylation may be obtained by chemically altering the degree of acetylation in natural as well as artificial pectins.

In accordance with the invention, the pectin is suitably used in an amount which is in the range of 1–90 wt % of the colouring substance, such as in the range of 2–80 wt %. In preferred embodiments, the amount of the pectin hydrocolloid is in the range of 3–60 wt % such as in the range of 5–50 wt % and the amount of pectin can e.g. be less than 10 wt % of the colouring substance or at least 10 wt % of the colouring substance. In still other embodiments, the amount of pectin is at least 10 wt %, such as at least 20 wt % of the combined amounts of the pectin and at least one further hydrocolloid, if such a further hydrocolloid is present.

In other useful embodiments, the amount of pectin is more than 100 wt % of the pigment, i.e. the ratio between colouring substance and hydrocolloid can be in the range of 1:1 to 1:10,000 such as in the range of 1:10 to 1:5,000 or in the range of 1:100 to 1:1,000. The amount of pectin may also be calculated on the composition. Thus the amount of pectin is preferably in the range of 1–50 wt % of the composition, such as in the range of 1–10 wt %, e.g. 1.5, 2 or 2.5 wt %.

The colouring substance can be any food grade or pharmaceutically acceptable hydrophobic or hydrophilic colouring matter that, at least under certain conditions, is water insoluble or sparingly soluble in water as defined above, and which belongs to any of the above-mentioned types including synthetic colouring substances, natural colouring substances derived from a natural source and "nature identical" colouring substances. When the colouring substance is a natural color as defined herein, it may be in a substantially pure form or it may be contained in the material where it occurs naturally such as a plant, animal or microbial material, optionally in combination with a food grade and/or pharmaceutically acceptable carrier. The presently most commonly used water-insoluble or sparingly soluble natural colouring substances that are useful in the composition according to the invention include carotenoids, curcumin, carmine, porphyrin pigments including chlorophyll, and vegetable carbon black. It will be appreciated that the composition according to the invention may comprise a single colouring substance or it may contain two or more different colouring substances.

Carotenoids which have yellow, orange or red colours occur widely in nature and important sources include plants including grass species, the annatto tree, citrus species, *Capsicum annum, Crocus sativus* flowers and marigold flowers, marine algae, yeast species and some animals. Carotenoids can be divided into the following classes: carotenoid hydrocarbons, xanthophylls and apocarotenoids. Typical examples of carotenoids include bixin, norbixin, β-carotene, apocarotenals, canthaxanthin, saffron, crocin, capsanthin and capsorbuin occurring in paprika oleoresin, lutein, astaxanthin, rubixanthin, violaxanthin, rhodoxanthin, lycopene and derivatives hereof.

Further water-insoluble and/or hydrophobic colouring substances that are useful in the present invention include curcumin which is the major pigment in turmeric, the coloured oleoresin extract of the Curcuma root, vegetable carbon black, which is produced by fully carbonising vegetable material and grinding it to a fine powder, and the porphyrine pigments such as oil-soluble chlorophylls based substantially on phaeophytin a or b and epimers and isomers thereof.

In the present context, a further important class of natural colouring substances is quininoid pigments of which the most commonly used is cochineal carmine that is obtained by aqueous extraction from the insect *Coccus cacti*. Normally, the extract is precipitated as the insoluble aluminium lake known as cochineal carmine which is soluble in alkaline aqueous media but is sparingly soluble in aqueous media having a pH below about 9.

A still further useful class of natural colouring substances is the polyphenols, which are extracted from grape seeds and which are characterised as having a desired colour but also an off-flavour. In order to reduce or eliminate this off-flavour it is convenient to encapsulate the substance in accordance with the method of the present invention.

Several of the colouring compounds described above may, in addition to their colouring properties, be useful for their health improving effects. Such health improving effects are well described in the art and includes antioxidant activities, diminished risk of cancer, skin protection, protection against age related macularar degeneration and protection against heart diseases.

In accordance with the invention, the colouring substance of the composition is preferably present in the form of bodies of an average largest dimension which is at the most 10 μm. More preferably, the colouring substance is in the form of bodies having an average largest dimension of at the most 5 μm, in particular at the most 2 μm including an average largest dimension of at the most 1 μm, e.g. at the most 0.1 μm such as at the most 0.01 μm. It is contemplated that the ability of the colouring substance to provide an attractive colour hue and to provide an efficient colouring, e.g. when the composition is used in coating compositions, is increasing with decreasing size of the colouring substance bodies. The colour saturation, colour hue and the transparency of coloured products can be controlled by appropriately selecting the size of the bodies of colouring substances.

There are several ways to classify the colour of a substance. Generally the colour characteristics of a substance may be characterised by three parameters, the hue, the saturation and the lightness.

Hue is an attribute associated with each of the dominant wavelengths of the visible spectrum and reflects the dominant colour of the composition (reddish, yellowish, bluish, etc.). Saturation pertains to the intensity of the colour composition and lightness reflects the amount of white or black in the colour composition.

When measured in a tristimulus system, e.g. a Minolta 310 apparatus, saturation is expressed by the parameters "chroma", hue is expressed in degrees by the parameter H and L is expressed by the parameter L. Chroma, H and L, measured at a standard pigment concentration, may be used as a way of characterising and comparing different colour preparations of the same pigment. Especially the chroma is very important. Generally a high chroma for a certain pigment concentration is desirable. Accordingly, a colour may be characterised by its chroma value reflecting the "colouring strength" or "colouring power" of the substance.

In accordance with one useful embodiment, the colouring substance bodies in the composition are solid particles, such as e.g. solid particles of a carotenoid, carmine, curcumin, a porphyrin pigment including chlorophyllin, and vegetable carbon black.

The invention encompasses, as it is mentioned above, use of colouring substances that are water insoluble or sparingly soluble in aqueous media at about neutral pH or below or at pH levels of up till about 9, but soluble in alkaline aqueous media. It will be appreciated that it is possible to obtain solid particles of such colouring substances by precipitation of the colouring substances caused by acidifying an alkaline solution of the substance.

The selection of a suitable amount of the colouring substance in the composition according to the invention depends on the particular type of colouring substance and the particular intended application for the composition and a wide range of the amount of colouring substance is therefore contemplated such as a range of 0.5–90 wt % of the composition, although amounts in excess of this range are also envisaged. In preferred embodiments, the amount of colouring substance is in the range of 1–50 wt % and it is in useful embodiments in the range of 5–40 wt %. Based on the dispersion as it is initially prepared, a useful amount of colouring substance is in the range of 2–30 wt % including 5–10 wt %.

In accordance with the invention, the composition may comprise an aqueous phase that, as a further component, comprises a plasticising agent such as a carbohydrate or a sugar alcohol or a mixture thereof. The carbohydrate is preferably selected from a monosaccharide, a disaccharide and an oligosaccharide including as example glucose, lactose, fructose and sucrose. The sugar alcohol can e.g. be selected from sorbitol, mannitol, dulcitol, adonitol and glycerol. The amount of the plasticising agent is preferably in the range of 0–95 wt % of the dispersion, such as in the range of 5–50 wt % including the range of 10–30 wt % of the composition.

Whereas for certain applications it is preferred to provide the colouring substance in the form of solid particles, the colouring substance can also be provided in the form of droplets of an oleoresin colouring substance or droplets of a dispersion or an emulsion of a colouring substance.

For certain applications the composition of the invention is conveniently provided as a composition comprising water in excess of 10 wt %. One advantage of such a composition is the possibility to provide it with a water content within a wide range whereby the composition can be adapted to particular customer demands. A composition containing at least 10 wt % of water having a low content of water will appear as a powder or a viscous paste. Depending on the colouring substance, a composition having a water content in the range of 10–40 wt % will, depending on the water content, typically appear as a powder, a paste, a gel or a viscous liquid. With an increasing water content above this vessel, i.e. in excess of 40 wt % water, the consistency of the composition will acquire an increasingly lower viscosity and become increasingly liquid. It is contemplated that a concentrated pasty composition will be advantageous from a user point of view, since it can easily be distributed and stored and furthermore, the colouring substance will be protected well against light and oxidation in such a concentrate. It is evident that a concentrate composition according to the invention can be diluted with water or any other diluent to any desired content of colouring substance.

In other useful embodiments, the composition according to the invention has a water content of at the most 10 wt %, such as at the most 7.5 wt % or at the most 5 wt %. Such a composition appears as a dry product which, depending on the manufacturing process, may be in the form of e.g. a powder, a granulate or a flaked product. A dry composition according to the invention is provided by at least partially dehydrating the initial dispersion or suspension, e.g. by any conventional drying process including any of the processes disclosed in WO 91/06292 to which there is referred. Thus, a final dried composition according to the invention may optionally contain a spray drying excipient such as e.g. a starch component.

Whereas it has been found that beet pectin, chicory pectin and/or Jerusalem artichoke pectin is highly effective as a wetting and/or dispersing agent in the manufacturing of the composition of the invention, it is within the scope of the invention to apply at least one further hydrocolloid including those hydrocolloids that are mentioned in WO 97/26803 to which there is referred. Such a further hydrocolloid is e.g. selected from a protein including gelatine or soybean protein, a polysaccharide such as e.g. a modified starch or a cellulose derivative, or a gum. It is also possible to combine beet pectin, chicory pectin and/or Jerusalem artichoke pectin with one or more other pectins including pectins derived from apples or citrus fruit.

It will be appreciated that the present composition may contain further additive components conventionally used in colouring substance or pigment compositions such as an antioxidant, a preservative, a wetting agent, a pH regulating agent, a surfactant, an emulsifier or a dispersing agent.

It is another objective of the present invention to provide a method of producing a colouring substance composition as described above, said method comprising as an initial step that a dispersion of the colouring substance is prepared by comminuting the colouring substance in an aqueous phase comprising beet pectin, chicory pectin and/or Jerusalem artichoke pectin in an amount of at least 1% of the colouring substance to obtain a dispersion containing the colouring substance in the form of bodies of the substances that are at least partially coated or encapsulated with the pectin.

In a first step of this method, a dispersion of the colouring substance is prepared by mixing the colouring substance into an aqueous phase. The mixing step is preferably carried out without the addition of other surface-active substances than the pectin and optionally further hydrocolloids. The mixing step can be carried out using any conventional mixing or blending method known in the art. Optionally, the mixing is followed by communication to obtain discrete colouring substance bodies having a largest average dimension of at the most 10 $\mu$m. However, it is generally preferred to continue the communication until the colouring substance is in the form of bodies having an average size of at the most 5 $\mu$m, preferably at the most 2 $\mu$m and more preferably at the most 1 $\mu$m. It may also be advantageous to let the comminution proceed until an average largest dimension of at the most 0.1 $\mu$m such as at the most 0.01 $\mu$m is achieved. The above communication may be repeated one or more times in order to obtain the desired body size.

Applicable comminution methods include milling, e.g. using a ball mill, as it described in the below examples.

The step of dispersing the colouring substance can, if desired, be carried out in at least two steps in which an additional amount of pectin is added in the second and/or any subsequent step. It will be understood that the method of the invention may also comprise the preparation of a colouring substance dispersion in which mixtures of two or more colouring substances are used. In this manner, colouring substance compositions having a particularly attractive colour can be provided as the result of the combination of two or more colouring substances having different colour hue or saturation.

As mentioned above, the method of the invention may comprise the addition to the aqueous phase of a plasticising agent such as a carbohydrate or a sugar alcohol either before or after the mixing of the colouring substance, or it may include the incorporation into the dispersion of at least one further component e.g. selected from an antioxidant, a stablising agent, a viscosity modifying agent, an alcohol, a resin or a preservative agent.

In useful embodiments, the above method includes a further step of at least partially rehydrating the pigment dispersion to obtain a composition containing less than 10 wt % of water.

In a further aspect the invention pertains to the use of the composition according to the invention as a colouring agent in the manufacturing of an edible product. As used herein, the expression "edible product" denotes any solid or liquid food product. Edible products also include the product types referred to as "nutraceuticals", "functional foods" or "health foods" (these three terms are used interchangeably herein), i.e. food products or food supplements comprising components that are considered to confer certain health improving characteristics. Such products may be in any conventional forms including products in tablet or capsule dosage forms which e.g. may comprise separate compartments. It will be appreciated that when a composition according to the invention is sued in the manufacturing of such nutraceutical products, the colouring substance can, in addition to its colouring effect, also confer to such products a nutritionally and/or health improving effect. As an example, $\beta$-carotene, which is a colouring substance belonging to the class of carotenoids, has certain pharmaceutical and/or health improving effects. Other examples of colouring substances or derivatives of colouring substances having pharmaceutical or health improving effects include tocophenols, tocotrienols and polyphenols.

Several food products have an aqueous phase with a pH below 7 and this acidic environment will in many instances render a pigment as such unstable and the pigment will tend to precipitate resulting in a change of the colour. This is e.g. observed in products such as acidified milk products and beverages. The compositions of the present invention are particularly useful in acidic food products as the compositions are acid-proof and do not precipitate.

In other useful embodiments, the composition according to the invention is used for colouring of liquid food products including soft drinks, carbonated beverage products and milk products.

An interesting application of the composition according the invention is the colouring of edible products, the manufacturing of which includes an extrusion step, e.g. edible films for containing a food product such as a meat product or a vegetable product. A typical example hereof is collagen films used as casings for sausage products. An effective amount of the colouring substance composition is added to the aqueous mixture to be extruded or casted and the resulting edible film will contain the colouring substance. It has been found that the colouring substances when incorporated in such extruded edible films substantially do not migrate into the contained food product and furthermore, the colouring substance is not released into water in which the products are cooked. Use of edible films for covering vegetables are increasing as it confers an improved shelf-life to vegetables which are normally stored individually and unprotected in the retail shops. Such covering films for use for e.g. tomatoes may advantageously be coloured by a composition of the invention.

Other examples of extruded products where the composition according to the invention is useful include breakfast cereals, cakes, breads, snacks, confectionery products, breadings, crisps and grains. It has been found that the fact that the compositions do not contain any lipids for surface active substances make them particularly useful in the manufacturing of expanded products made by an extrusion process, as the expansion in such processes is lower when lipids and/or surface active substances are added to the extrusion mixture.

A further advantageous use of the compositions is the colouring of confectionery products including as examples candies, acid drops and jelly products, since the colouring substances in the compositions according to the invention are acid stable.

Several food products such as e.g. soft drinks, juices, soups and sauces are manufactured as initially liquid products which are subsequently dehydrated to a dry storage stable product typically having a water content of at the most 10 wt %. The compositions according to the invention are also useful for the colouring of such products in that the colouring of the products after rehydration will substantially be of the same strength and hue as the starting liquid food product prior to dehydration.

It is a well-known problem in the food industry that colouring agents used in food products tend to migrate within the food product or into the environment of the product. This phenomenon is also referred to in the art as "bleeding". This problem is particularly troublesome if it occurs in food products that comprise multiple, separated compartments or layers where the colouring agent is not added to all of such compartments. A colouring agent which does not migrate in such products is therefore highly desirable in the industry. It has been found that the colouring substances of the compositions according to the invention are retained in the compartment(s) to which they have been added and do not migrate into adjacent non-coloured compartments.

One typical example of such a compartmentalised or layered food product is dessert products, which optionally are acidulated and which comprise at least one layer of fruit filling, e.g. in the form of jelly, to which a colouring agent is added, and one or more layers of other ingredients also having an aqueous phase to which the colouring agent is not added. Another example of such a product is layered cake. It is evident that migration of colouring agent into the non-coloured layers results in a highly unacceptable appearance of these layered products. The composition according to the invention can be used in such products without giving rise to "bleeding" problems. A further example of a product where it is advantageous to avoid migration of colouring substances is a cereal breakfast product to be eaten with milk.

Avoidance of migration of colouring substances is also critical in connection with edible products comprising a surface decoration layer in which a colouring agent is dispersed. Clearly, it is undesirable if the added colouring substance migrates from the decoration layer into the adjacent product layer. Typical examples of surface decorated products are meat products such as surimi and other delicatessen products where the decoration e.g. may be in the form of a water-based gel which is coloured with the colouring substance composition whilst liquid and subsequently applied on the product to solidify. Further examples of surface decorated products are bakery products having sugar icing (glazing) or coloured decoration particles on top. When added to such decoration layers or particles, the colouring substances of the compositions according to the invention do not migrate from such layers or particles.

Dragees constitute a particular type of edible multilayered products where one or more coating layers are applied onto a centre of an edible component. Examples of such centres to be coated include chewing gum, sugar granulates, sugar tablets and chocolate. Colouring of such centres is typically carried out in one or more panning steps where the centres are coated with sugar syrup containing the colouring agent. Normally, it is required to apply several coating layers to obtain a sufficient covering with colouring substance. With known water soluble or water dispersible colouring substance compositions based on lakes it is frequently required to apply 20 coating layers or more. It has been found that the compositions according to the invention are highly suitable for such coating purposes and that dragees with a sufficient colouring can be obtained by applying less than 20 layers, such as 2–15 layers. Furthermore, it has been found that the colouring substances of the compositions of the invention as contained in coating layers do not come off on fingers on handling or on mucosal surfaces when the dragees are consumed.

A highly attractive characteristic of the compositions according to the invention is that they are uesful as colouring agents in the manufacturing of pharmaceutical products. Thus, the compositions can be used for colouring of pharmaceutical products comprising multiple, separated compartments essentially in the same manner and with the same advantages as described above for compartmentalised food products. In particular, the compositions are useful for colouring of compositions for conventional film-coating of tablets, pills or granules containing pharmaceutically active substances.

For such coating purposes, the water dispersible compositions of the invention are typically added to a sugar syrup suspension, e.g. based on sucrose. The solid content of such a coating syrup is normally in the range of 60–80 wt %. The amount of the colouring composition of the invention which is added to the coating syrup is generally in the range of 0.5 to 50 wt % of the syrup. The thus coloured coating mixture may contain further components such as stabilisers, preservative, viscosity modifying agents and plasticisers.

The pharmaceutical centres are coated repeatedly in a conventional panning process and the number of repeated coatings that are required depends on the particular pigment and the desired appearance of the finished product. However, with the composition according to the invention, relatively few coating layers are required to obtain an attractive colouring. Thus, less than 20 layers are normally required and in most cases, 5–15 layers will suffice.

In addition to the above applications of the present colouring substance compositions, they are also useful for colouring of pharmaceutical products in liquid form such as solutions, suspensions or dispersions having an aqueous phase.

In a further aspect of the present invention a colouring composition is provided which when tested in a soft drink system is characterised by the colouring characteristics given by the measurements of the composition using a Minolta Tristimulus CT 310 apparatus, when tested in a soft drink system. The test soft drink system contains: sucrose, 430.0 g; Na-benzoate, 0.7 g; K-sorbate, 0.9 g; Ascorbic acid, 0.1 g; Citric acid mono-hydrate, food grade, 8.6 g and demineralised water added to 1 liter and further diluted to 5 liter. When tested in this system colouring compositions containing turmeric (30 ppm) resulted in a chroma value of at least 30, colouring compositions containing bixin (30 ppm) resulted in a chroma value of at least 25 and colouring compositions containing chlorophylin (20 ppm) resulted in chroma value of at least 33.

The invention will now be further illustrated in the following non-limiting examples.

EXAMPLES

Testing of Colouring Characteristics of Suspensions of Colouring Substances

In the following is described the preparation of wet milled suspensions of colouring substances, the suspensions comprising as a wetting agent beet pectin or other hydrocolloids. The colouring characteristics of these suspensions were tested for their colouring characteristics using Minolta Tristimulus CT 310 apparatus in a standardised soft drink system at a standard pigment content. For turmeric and chlorophyllin the colouring substance content was set at 30 ppm and for bixin at 20 ppm.

The soft drink system was prepared from a concentrate having the following composition:

| | |
|---|---|
| Sucrose | 430.0 g |
| Na-benzoate, food grade | 0.7 g |
| K-sorbate, food grade | 0.9 g |
| Ascorbic acid | 0.1 g |
| Citric acid mono-hydrate, food grade | 8.6 g |
| Demineralised water | ad 1 liter |

The concentrate was diluted 1:4 before use with demineralised water. The diluted ready-to-use soft drink medium had a pH of 3.0±0.2.

The measured tristimulus values were compared with specifications for commercial pigment products. The key parameter is the so-called "chroma" value which provides an indication of the colouring strength or "colouring power" of the colouring substance suspension product. For turmeric (curcumin), the chroma value should exceed 25, for chlorophyllin the value should exceed 19 and for bixin it should exceed 16, at the above mentioned pigment levels.

Example 1

66.6 g of soybean protein (DanPro S-740, Central Soya), 934 g of sucrose and 200 g of turmeric powder were added to 800 g of demineralised water. When the soybean protein had been dissolved and the turmeric powder had been sufficiently wetted the suspension was milled using a Dynomill type KDL ball mill (twice through the mill).

The resulting milled suspension was tested for its colouring characteristic according to the above test procedure. A chroma value of 3 was found which is significantly below the desired minimum specification of 25.

Example 2

A suspension consisting of 3.33% of hydroxypropyl cellulose (Klucel FP 10 13062), 46.7% of sucrose, 10% turmeric powder and 40% of demineralised water was prepared. When the hydroxypropyl cellulose had been dissolved and the turmeric powder had been sufficiently wetted the suspension was milled using a Dynomill type KDL ball mill (twice through the mill).

The resulting milled suspension was tested for its colouring characteristics according to the above test procedure. A chroma value of 2 was found which is significantly below the desired minimum specification of 25.

Example 3

A suspension consisting of 3.33% of modified starch (Cleargum, Roquette Freres), 46.7% of sucrose, 10% of tumeric powder and 40% of demineralised water was prepared. When the modified starch had been dissolved and the turmeric powder had been sufficiently wetted the suspension was milled using a Dynomil type KDL ball mill (twice through the mill).

The resulting milled suspension was tested for its colouring characteristics according to the above test procedure. A chroma value of 12 was found which is significantly below the desired minimum specification of 25.

Example 4

A suspension consisting of 3.33% of gum arabic (Instant Soluble Gum Arabic, Alland & Robert), 46.7% of sucrose, 10% of turmeric powder and 40% of demineralised water was prepared. When the gum Arabic had been dissolved and the turmeric powder had been sufficiently wetted the suspension was milled using a Dynomill type KDL ball mill (twice through the mill).

The resulting milled suspension was tested for its colouring characteristics according to the above test procedure. A chroma value of 20 was found which is below the desired minimum specification of 25.

Example 5

A suspension consisting of 12.1% of gelatine (Solugel LM, PB Gelatins), 36.1% of sucrose, 15.8% of turmeric powder and 36% of demineralised water was prepared. When the gelatine had been dissolved and the turmeric powder had been sufficiently wetted the suspension was milled using a Dynomill type KDL ball mill (twice through the mill).

The resulting milled suspension was tested for its colouring characteristics according to the above test procedure. A chroma value of 13 was found which is significantly below the desired minimum specification of 25.

Example 6

10 g (1 wt %) of citrus pectin (GENU pectin 150 grade USA-SAG type B rapid set, Copenhagen Pectin A/S), 440 g of sucrose and 50 grams of turmeric powder were added to 500 g of demineralised water. When the pectin had dissolved and the turmeric powder sufficiently wetted, the suspension was milled using a DynoMill type KDL ball mill (twice through the mill).

The resulting milled suspension was tested according to the above test procedure. A chroma value of 10 was found which is significantly below the specification value of 25 in the used standard soft drink system.

Example 7

15 g (1.5 wt %) of citrus pectin (GENU pectin 150 grade USA-SAG type B rapid set, Copenhagen Pectin A/S), 435 g of sucrose and 50 grams of turmeric powder were added to 500 g of demineralised water. When the pectin had dissolved and the turmeric powder sufficiently wetted, the suspension was milled using a DynoMill type KDL ball mill (twice through the mill).

The resulting milled suspension was tested according to the above test procedure. A chroma value of 22 was found which is below the specification value of 25 in the used standard soft drink system.

Example 8

20 g (2 wt %) of citrus pectin (GENU pectin 150 grade USA-SAG type B rapid set, Copenhagen Pectin A/S), 430 g of sucrose and 50 grams of turmeric powder were added to 500 g of demineralised water. When the pectin had dissolved and the tumeric powder sufficiently wetted, the suspension was milled using a DynoMill type KDL ball mill (twice through the mill).

The resulting milled suspension was tested according to the above test procedure. A chroma value of 23 was found which is below the specification value of 25 in the used standard soft drink system.

Example 9

10 g (1 wt %) of citrus pectin (GENU pectin type LM-104 AS, Copenhagen Pectin A/S), 440 g of sucrose and 50 grams of turmeric powder were added to 500 g of demineralised water. When the pectin had dissolved and the turmeric powder sufficiently wetted, the suspension was milled using a DynoMill type KDL ball mill (twice through the mill).

The resulting milled suspension was tested according to the above test procedure. A chroma value of 14 was found which is significantly below the specification value of 25 in the used standard soft drink system.

Example 10

15 g (1.5 wt %) of citrus pectin (GENU pectin type LM-104 AS, Copenhagen Pectin A/S), 435 g of sucrose and 50 grams of turmeric powder were added to 500 g of demineralised water. When the pectin had dissolved and the turmeric powder sufficiently wetted, the suspension was milled using a DynoMill type KDL ball mill (twice through the mill).

The resulting milled suspension was tested according to the above test procedure. A chroma value of 14 was found which is significantly below the specification value of 25 in the used standard soft drink system.

Example 11

20 g (2 wt %) of citrus pectin (GENU pectin type LM-104 AS, Copenhagen Pectin A/S), 430 g of sucrose and 50 grams of turmeric powder were added to 500 g of demineralised water. When the pectin had dissolved and the turmeric powder sufficiently wetted, the suspension was milled using a DynoMill type KDL ball mill (twice through the mill).

The resulting milled suspension was tested according to the above test procedure. A chroma value of 16 was found which is significantly below the specification value of 25 in the used standard soft drink system.

Example 12

8 g (1 wt %) of beet pectin (GENU pectin type BETA, Copenhagen Pectin A/S), 352 g of sucrose and 40 grams of turmeric powder were added to 400 g of demineralised water. When the pectin had dissolved and the turmeric powder had been sufficiently wetted, the suspension was milled using a DynoMill type KDL ball mill (twice through the mill). The resulting milled suspension was tested for its colouring characteristics according to the above test procedure. A chroma value of 30 was found which is above the desired minimum specification value of 25.

Example 13

12 g (1.5 wt %) of beet pectin (GENU pectin type BETA, Copenhagen Pectin A/S), 348 g of sucrose and 40 grams of turmeric powder were added to 400 g of demineralised water. When the pectin had dissolved and the turmeric powder had been sufficiently wetted, the suspension was milled using a DynoMill type KDL ball mill (twice through the mill).

The resulting milled suspension was tested for its colouring characteristics according to the above test procedure. A chroma value of 34 was found which is significantly above the desired minimum specification value of 25.

Example 14

16 g (2 wt %) of beet pectin (GENU pectin type BETA, Copenhagen Pectin A/S), 344 g of sucrose and 40 grams of turmeric powder were added to 400 g of demineralised water. When the pectin had dissolved and the turmeric powder had been sufficiently wetted, the suspension was milled using a DynoMill type KDL ball mill (twice through the mill).

The resulting milled suspension was tested for its colouring characteristics according to the above test procedure. A chroma value of 37 was found which is significantly above the desired minimum specification value of 25.

Example 15

40 g (1 wt %) of beet pectin (GENU pectin type BETA, Copenhagen Pectin A/S), 1153.3 g of sucrose and 133.3 g of crystalline bixin were added to 1333.3 g of demineralised water. When the pectin had dissolved and the crystalline bixin had been sufficiently wetted, the suspension was milled for 1 hour and 20 minutes using a DynoMill type KDL ball mill.

The resulting milled suspension was tested for its colouring characteristics according to the above test procedure. A chroma value of 39 was found which is significantly above the desired minimum specification value of 16.

Example 16

40 g (1 wt %) of beet pectin (GENU pectin type BETA, Copenhagen Pectin A/S), 865 g of sucrose and 40 g of crystalline bixin were added to 1000 g of demineralised water. When the pectin had dissolved and the crystalline bixin had been sufficiently wetted, the suspension was milled for 50 minutes using a DynoMill type KDL ball mill.

The resulting milled suspension was tested for its colouring characteristics according to the above test procedure. A chroma value of 25 was found which is significantly above the desired minimum specification value of 16.

Example 17

A suspension containing 66 g of sodium copper chlorophyllin powder in 540 g of demineralised water containing 24 g of citric acid was prepared. 24 g of beet pectin (GENU pectin type BETA, Copenhagen Pectin A/S) and 546 g of fructose were added. The suspension was milled in DynoMill type KDL ball mill for 1 hour and 20 minutes.

The resulting milled chlorophyllin suspension was tested for its colouring characteristics according to the above test procedure. A chroma value of 33 was found which is significantly above the desired minimum specification value of 19.

Example 18

A water dispersible suspension of turmeric was prepared at an industrial scale according to the following process:

6 kg of beet pectin (GENU pectin type BETA, Copenhagen Pectin A/S), 173 kg of sucrose and 21 kg of turmeric powder were added to 200 kg of demineralised water. When the pectin had been dissolved and the turmeric powder had been sufficiently wetted the suspension was milled for 50 minutes using a Fryma type MS ball mill.

The resulting milled turmeric suspension was tested for its colouring characteristics according to the above test procedure. A chroma value of 36 was found which is significantly above the desired minimum specification value of 25.

Example 19

50 grams (10%) of a polyphenol preparation (Grape pomace extract powder AC-WS-P-109, Chr. Hansen A/S, containing 18% procyanidins and 45% polyphenols in total), 12.5 grams (2.5%) of beet pectin (GENU pectin type BETA, Copenhagen Pectin A/S) and 212.5 g (42.5%) of sucrose were added to 225 grams of water and heated to 45 degrees Celsius for 2 hours.

The product was tested for its colouring properties by adding 1.11 grams to 250 mL of the above mentioned soft drink medium. A chroma value of 35 was found.

The milled suspension was subsequently dried using a conventional spray drying equipment. No change in the colouring characteristics was found after the drying step.

In the below Table 1 the chroma values for the water dispersible pigment products are summarised:

TABLE 1

Chroma values of water dispersible colouring substance products in a standard soft drink medium

| Example | Colouring substance | Hydrocolloid type | Found chroma value | Desired chroma value (minimum specification) | Found: desired chroma value |
|---|---|---|---|---|---|
| 1 | turmeric | Soy bean protein (DanPro S 740) | 3 | 25 | 0.12 |
| 2 | turmeric | Hydroxypropyl-cellulose (Klucel FP 10 13062) | 2 | 25 | 0.08 |
| 3 | turmeric | Modified starch (Clear-gum, Roquette Freres) | 12 | 25 | 0.48 |
| 4 | turmeric | Gum Arabic (Instant Solble Gum Arabic) | 20 | 25 | 0.80 |
| 5 | turmeric | Gelatine (Solugel LM) | 13 | 25 | 0.52 |
| 6 | turmeric | Citrus, USA-SAG type B, 1 wt % | 10 | 25 | 0.40 |
| 7 | turmeric | citrus, USA-SAG type B, 1.5 wt % | 22 | 25 | 0.88 |
| 8 | turmeric | citrus, USA-SAG type B, 2 wt % | 23 | 25 | 0.92 |
| 9 | turmeric | citrus, LM-104 AS, 1 wt % | 14 | 25 | 0.56 |
| 10 | turmeric | citrus, LM-104 AS, 1.5 wt % | 14 | 25 | 0.56 |
| 11 | turmeric | citrus, LM-104 AS, 2 wt % | 16 | 25 | 0.56 |
| 12 | turmeric | beet, type BETA, 1 wt % | 30 | 25 | 1.20 |
| 13 | turmeric | beet, type BETA, 1.5 wt % | 34 | 25 | 1.36 |
| 14 | turmeric | beet, type BETA, 2 wt % | 37 | 25 | 1.48 |
| 15 | bixin | beet, type BETA, 1.5 wt % | 39 | 16 | 2.44 |
| 16 | bixin | beet, type BETA, 2 wt % | 25 | 16 | 1.56 |
| 17 | chlorophyllin | beet, type BETA, 2 wt % | 33 | 19 | 1.74 |
| 18 | turmeric | beet, type BETA, 1.5 wt % | 36 | 25 | 1.44 |
| 19 | polyphenol | beet, type BETA, 2.5 wt % | 35 | — | — |

What is claimed is:

1. A composition comprising a colouring agent, the colouring agent comprising colouring substance bodies that are at least partially coated with a beet pectin, wherein the colouring agent is produced by a process consisting essentially of:

mixing a dispersion comprising (i) the colouring substance and (ii) the beet pectin in an amount of at least 1% of the colouring substance thereby obtaining a dispersion of the colouring substance bodies that are at least partially coated with the beet pectin.

2. A composition according to claim 1 where the colouring substance bodies are at least partially coated with pectin which has a degree of acetylation of at least 10%.

3. A composition according to claim 1 where, at least under certain conditions, the colouring substance is a substance that is insoluble or sparingly soluble in an aqueous medium.

4. A composition according to claim 1 where the colouring substance bodies have an average largest dimension of at most 10 μm.

5. A composition according to claim 1 where the colouring substance is a substance which, in addition to its colouring effect, has a health improving effect.

6. A composition according to claim 1 where the colouring substance is a natural colouring substance.

7. A composition according to claim 6 where the colouring substance is selected from the group consisting of a carotenoid, carmine, curcumin, a polyphenol, a porphyrin pigment, chlorophyllin, and vegetable carbon black.

8. A composition according to claim 7 where the colouring substance is in the form of particles that are obtained by precipitation of the substance caused by acidifying an alkaline solution thereof.

9. A composition according to claim 1 which further comprises a plasticising agent including a sugar.

10. A composition according to claim 1 where the colouring substance is in the form of solid particles.

11. A composition according to claim 1 where the colouring substance is in the form of droplets of an oleoresin pigment or droplets of a dispersion or an emulsion of a pigment.

12. A composition according to claim 1 that has a water content of at the most 10 wt %.

13. A composition according to claim 12 which is dried and optionally comprising a spray drying excipient.

14. A composition according to claim 1 where the colouring substance bodies are at least partially coated with at least one further hydrocolloid.

15. A composition according to claim 14 where the further hydrocolloid is selected from the group consisting of a protein, a polysaccharide and a gum.

16. A composition according to claim 15 where the protein is selected from the group consisting of gelatine and soybean protein.

17. A composition according to claim 15 where the polysaccharide is selected from the group consisting of a pectin, a modified starch and a cellulose derivative.

18. A composition according to claim 14 where the amount of pectin is at least 10% of the beet pectin and the at least one further hydrocolloid.

19. A composition according to claim 1 where the amount of pectin is at least 10 wt % of the colouring substance.

20. A composition according to claim 1 comprising an additive selected from the group consisting of an antioxidant, a wetting agent, a surfactant, an emulsifier and a dispersing agent.

21. A composition according to claim 1 wherein the colouring substance bodies comprise two or more colouring substances.

22. A composition according to claim 1 which is water dispersible.

23. A method of producing a colouring composition, said method consisting essentially of:

(a) mixing a dispersion comprising (i) a colouring substance, and (ii) beet pectin in an amount of at least 1% of the colouring substance is an aqueous phase thereby obtaining a dispersion of the colouring substance at least partially coated with the beet pectin;

(b) optionally comminuting the colouring substance in the aqueous phase;

(c) optionally at least partially dehydrating or concentrating the dispersion; and (d) optionally hydrating the dispersion.

24. A method according to claim 23 wherein the colouring substance is comminuted in the aqueous medium by means of a ball mill.

25. A method according to claim 24 wherein the colouring substance bodies in the resulting composition have an average largest diameter of at the most 10 μm.

26. A method according to claim 23 wherein the colouring substance bodies in the resulting composition have an average largest dimension of at the most 10 μm.

27. A method according to claim 23 comprising the further step of at least partially dehydrating or concentrating the colouring substance-containing dispersion.

28. A method according to claim 23 wherein the aqueous phase comprises a plasticising agent including a sugar.

29. A method for producing an edible product, comprising mixing the composition according to claim 1 with the edible product.

30. The method according to claim 29 wherein the edible product is a beverage.

31. A method for manufacturing a pharmaceutical or nutraceutical product, comprising mixing the composition according to claim 1 with a pharmaceutical composition or a nutraceutical composition.

32. A pharmaceutical or nutraceutical product comprising the composition according to claim 1.

33. An edible product comprising the composition according to claim 1.

34. A colouring composition according to claim 1, wherein the colouring substance comprises turmeric which, when tested in a soft drink system containing sucrose, 430.0 g; Na-benzoate, 0.7 g; K-sorbate, 0.9 g; Ascorbic acid, 0.1 g; Citric acid mono-hydrate, 8.6 g and demineralised water added to 1000.0 g, results in a chroma value of at least 30 when measured with a Minolta Tristimulus CT 310 apparatus.

35. A colouring composition according to claim 1, wherein the colouring substance comprises bixin which, when tested in a soft drink system containing sucrose, 430.0 g; Na-benzoate, 0.7 g; K-sorbate, 0.9 g; Ascorbic acid, 0.1 g; Citric acid mono-hydrate, 8.6 g and demineralised water added to 1000.0 g, results in a chroma value of at least 25 when measured with a Minolta Tristimulus CT 310 apparatus.

36. A colouring composition according to claim 1, wherein the colouring substance comprises chlorophyllin which, when tested in a soft drink system containing sucrose, 430.0 g; Na-benzoate, 0.7 g; K-sorbate, 0.9 g; Ascorbic acid, 0.1 g; Citric acid mono-hydrate, 8.6 g and demineralised water added to 1000.0 g, results in a chroma value of at least 33 when measured with a Minolta Tristimulus CT 310 apparatus.

37. A composition comprising a colouring substance at least partially coated with beet pectin, wherein the colouring substance is selected from the group consisting of carmine, curcumin, a polyphenol, a porphyrin pigment, chlorophyll, vegetable carbon black, and a quinoid pigment.

* * * * *